CODE SIGNAL SENDER WITH MEMORY STORAGE FACILITIES

Filed Jan. 21, 1963 2 Sheets-Sheet 1

INVENTOR
Vernon H. Parks, Jr.,
BY R. P. Miller
ATTORNEY

March 29, 1966 V. H. PARKS, JR 3,243,799

CODE SIGNAL SENDER WITH MEMORY STORAGE FACILITIES

Filed Jan. 21, 1963 2 Sheets-Sheet 2

Inventor
Vernon H. Parks, Jr.
By R. P. Miller

ATTORNEY

United States Patent Office 3,243,799 Patented Mar. 29, 1966

3,243,799 CODE SIGNAL SENDER WITH MEMORY STORAGE FACILITIES

Vernon H. Parks, Jr., Winston-Salem, N.C., assignor to Western Electric Company, Incorporated, New York, N.Y., a corporation of New York Filed Jan. 21, 1963, Ser. No. 252,674
11 Claims. (Cl. 340—353)

This invention relates to a code signal sender with memory storage facilities and more particularly to a code signal sender having facilities for storing a signal and transmitting the stored signal after the transmission of another signal.

This invention will be described in relation to a system for transmitting dot-dash signals of the type use in the International Morse Telegraph Code. This code employs two alternative output circuit conditions, mark and space. Various permutations of these conditions form dots and dashes which are combined to represent letters and words. The timing relationship between marking and spacing outputs and the timing relationship between letters and words is defined in accordance with timing units known as unit time intervals. The actual time duration of a unit time interval can be varied to produce code transmissions at any speed desired.

The shortest timing unit of the code is called a unit time interval. A dot consists of one unit time interval of marking output. A dash consists of three unit time intervals of marking output. Letters are represented by dots and dashes spaced apart by one unit time interval. The spacing between letters in a word is three unit time intervals. Spacing between words in a sentence is five unit time intervals. Spacing between sentences is seven unit time intervals.

Code sending devices of various semi-automatic types require a considerable amount of manual dexterity on the part of an operator in order to transmit accurate signals. The operator must make and break the dot and dash contacts of a mechanical key in a time sequence congruent with the time base of the system in order to maintain correct spacing between dots, dashes, letters, and words.

If an operator keys a dot contact during the period of time that a dash signal is being transmitted by a semi-automatic keyer of the self completing type, the dot will be absorbed into the dash, resulting in an inaccurate transmission of intelligence.

One object of this invention is to provide a new and improved code signal sender which accurately transmits coded signals.

Another object is to provide a code signal sender which transmits two signals of different durations and maintains accurate spacing between any sequence of transmitted signals.

A further object is to provide a code signal sender wherein memory circuitry is provided for storing a dot signal initiated by a momentary key contact closure during the transmission of a dash signal or during the space period following the dash, and transmitting the stored signal at a properly sequenced time, independently of the key contact condition at that time.

With these and other objects in mind, the present invention contemplates a code signal sender having a pulse generator enabled by a potential source when coupled through either a dot or dash, contact or terminal, of a mechanical key together with facilities for storing a dot signal during transmission of a dash signal. With the key positioned to the dot terminal, an enabling potential is applied to operate a pulse generator and a two count circuit which functions to produce an output pulse of one unit time interval duration. This output pulse is impressed on an output keyer circuit to generate a signal representative of a dot.

With the key positioned to the dash terminal, an enabling potential again operates the pulse generator and the two count circuit to produce a dot output. Simultaneous with the dot output, the two count circuit produces a second output to operate a four count circuit which functions to produce an output of two unit time intervals duration. The pulse generator is then rendered effective to operate the two count circuit a second time to produce and output of one unit time interval duration. The output of the four count circuit and two count circuit are combined and coupled to the output keyer circuit to generate a signal of three unit time intervals duration, representative of a dash.

If the dot terminal is contacted during the transmission of a dash, the storage facilities, comprising a pair of memory storage circuits, are rendered effective to store the dot, and then transmit the dot after the completion of the transmission of the dash and the following space, independent of the mechanical key position.

Other objects and advantages of the invention will become apparent with reference to the following detailed description and the accompanying drawings, wherein.

*General description*

Figure 1:
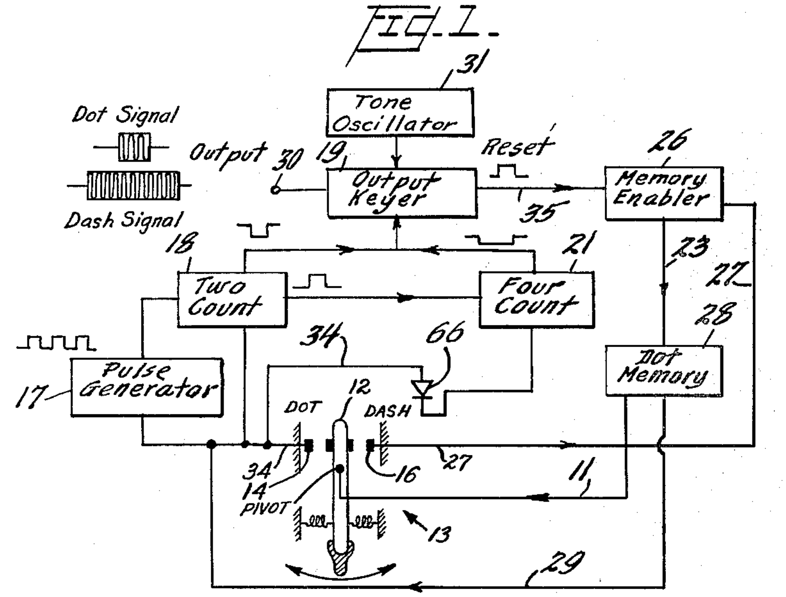
FIG. 1 is a block diagram of a code signal sender having memory storage facilities, incorporating the principles of the invention.

With reference to FIG. 1, there is shown an enabling potential applied over a lead 11 to a key lever 12 of a mechanical key 13 having a dot terminal 14 and a dash terminal 16. The enabling potential 11 is selectively connected to a pulse generator circuit 17 through either the dot terminal 14 or the dash terminal 16. The pulse generator 17 is connected to a two count circuit 18 which is connected to control an output keyer circuit 19 to generate a signal indicative of a dot. The output of the two count circuit 18 in conjunction with the operation of the key 12 against the dash terminal 16 operates a four count circuit 21 which in turn controls the output keyer circuit 19 to generate a signal indicative of a dash.

The enabling potential on lead 11 is selectively connected through the dash terminal 16 over a lead 27 to a memory enabler circuit 26. The memory enabler circuit 26 is connected over a lead 23 to a dot memory circuit 28 which is connected over lead 29 and a lead 34 to the pulse generator 17. A continuously operating tone oscillator circuit 31 is selectively connected to the output keyer 19 to couple a tone signal to one of a set of output terminals 30.

The general operation of the circuit is as follows: With the key lever 12 positioned at the dot terminal 14, the enabling potential on lead 11 is connected to permit the pulse generator 17 to operate to produce a train of timing pulses (waveform 120, FIG. 3). The timing pulses from the pulse generator 17 are coupled to trigger the two count circuit 18 into operation to produce a pulse output which is representative of a dot (waveform 130, FIG. 3). The dot pulse output is coupled to operate the output keyer 19 to apply a signal, representative of a dot at the output terminals 30.

With the key lever 12 positioned at the dash terminal 16, the enabling potential on lead 11 operates the two count circuit 18 to produce a dot output which is coupled to the output keyer circuit 19. The enabling potential on lead 11 is also applied through the dash terminal 16 to condition the four count circuit 21 for operation. Simultaneous with the dot output, the two count circuit 18 produces a second output which is applied to the conditioned four count circuit 21 to produce an output of two unit time intervals duration (waveform 140, FIG. 3). The pulse generator 17 is held operative by an enabling potential from the four count circuit 21 over a lead 22 to operate the two count circuit 18 to produce a second cycle output. The outputs of the four count circuit 21 and two count circuit 18 are combined and applied to operate the output keyer circuit 19 to apply a signal of three unit time intervals duration (waveform 150, FIG. 3) at the output terminals 30.

If the dot terminal 14 is inadvertently contacted during the transmission of a dash, the dot is ordinarily adsorbed into the dash in a conventional code signal sender. However, in the key circuit shown in FIG. 1, the closure of key lever 12 to the dash terminal 16 applies the enabling potential on lead 11 over a lead 27 to operate the memory enabler 26. The operated memory enabler 26 couples an enabling potential over lead 23 to condition the dot memory 28. Subsequent contacting of the dot terminal 14, during transmission of the dash or the following space interval, triggers the dot memory 28. This places an enabling potential over a lead 29 to the pulse generator 17. The pulse generator 17 is held operated to apply additional output pulses to the two count circuit 18. The two count circuit 18 then produces a dot pulse output which is coupled to the output keyer 19 to couple a signal, representative of a dot at the output terminals 30. This latter dot output generates a pulse from the output keyer 19 which is applied over a lead 35 to reset the memory enabler 26 and the dot memory 28.

*Dot operation*

Figure 2:
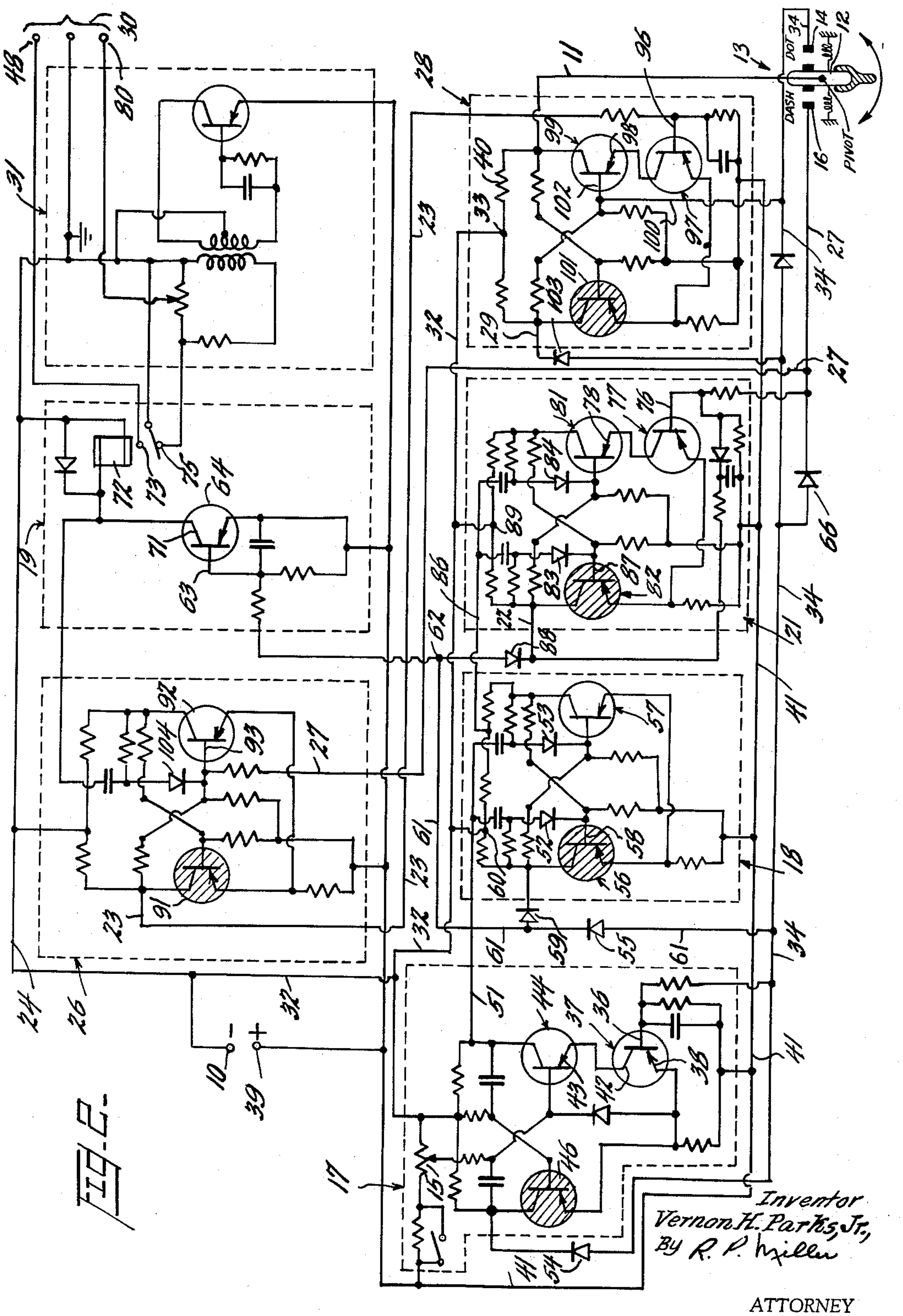
FIG. 2 is a detailed electrical schematic diagram of the block diagram of FIG. 1.

With reference to the detailed circuit diagram shown in FIG. 2, the transistors shown cross-hatched are normally in a conductive state or "on" condition when the code signal sender is in a quiescent state. A battery potential 10 is coupled over a lead 32, through a junction point 33, through a collector resistor 40, over the lead 11 to the key lever 12. With the lever 12 moved to the dot terminal 14, the enabling potential on lead 11 is connected over a lead 34 to a base 36 of an enabling transistor 37. Enabling transistor 37 has its emitter 38 connected over a lead 41 back to a power supply 39. Collector 42 of transistor 37 is connected to an emitter 43 of a transistor 44 of the pulse generator 17.

The pulse generator 17 is an astable or free-running multivibrator circuit having cross coupled transistors 44 and 46. The free-running multivibrator is essentially an oscillator in which one stage conducts while the other stage is nonconductive until a point is reached at which the stages reverse their conditions; that is, the conducting stage cuts off, and the cut off stage conducts. The reversing of the state of the stages continues back and forth without the aid of external stimuli as long as the multivibrator circuit is enabled by transistor 37.

With the key lever 12 positioned at the dot terminal 14, the enabling potential on lead 11 is impressed on the base 36 of the enabling transistor 37. The enabling transistor 37 behaves like a switch to place the emitter 43 of the transistor 44 at the emitter potential of transistor 46. The accompanying drop in the emitter potential of transistor 44 causes the transistors 44 and 46 to reverse conductive conditions which initiates the generation of a train of pulses. This train of positive going pulses is coupled over a lead 51 to the two count circuit 18 (see waveform 120, FIG. 3). The speed of repetition of these timing pulses may be varied throughout any useful range by a potentiometer 15.

The two count circuit 18 is a bistable multivibrator circuit having positive pulse steering provided by diodes 52 and 53. A bistable multivibrator is a trigger-type circuit which is at rest in either one of two stable states; that is, after the circuit has been triggered by an external source from one state to the other, the circuit will remain in that state until triggered again by an external source back to the original state. The two count circuit 18 includes transistors 56 and 57 having emitters connected over a lead 41 to the power supply 39.

With the code signal sender in the quiescent state, the normally conductive transistor 56 biases the diode 53 in the reverse direction. The first positive going pulse from the pulse generator 17 is thus applied only through the diode 52 to a base 58 to render the transistor 56 nonconductive; thereby, the transistor 57 is rendered conductive. When the transistor 56 turns off, the collector potential of transistor 56 is applied through a diode 59, over a lead 61, to a junction point 62, and then to a base 63 of a transistor 64.

The transistor 64 has a collector 71 connected to a relay 72 of the output keyer 19. The other end of the relay 72 is connected over a lead 24 to the battery 10. The transistor 64 is rendered conductive by the application of the collector potential of transistor 56 to the base 63. The transistor 64 behaves as a switch to complete a circuit to the power battery 10–39 to energize the relay 72. Energization of the relay 72 closes a contact 73 to provide a signal circuit between the output terminal 48 and ground. At the same time, contact 75 opens to permit the audio tone signal generated by oscillator 31 to be applied to an output terminal 80. This signal is of one unit time interval duration and represents a dot.

As mentioned above, the first positive going pulse from the pulse generator 17 turns transistor 56 off to apply the collector potential of transistor 56 to the output keyer 19. This collector potential is also applied through diodes 59 and 55 to the base 36 to hold the transistor 37 in a conductive state. This insures that a second pulse is produced from the pulse generator 17 and applied over the lead 51 through diode 53 to the base 76 of conducting transistor 57. This second pulse turns off transistor 57, thereby turning on transistor 56 and removing the collector potential of transistor 56 from the transistor 37 and the output keyer 19. Transistor 37 is held in conduction for the duration of a cycle of the pulse generator 17 by the potential existing at the collector of transistor 46 which is applied through the diode 54. This action resets the pulse generator 17 and two count circuit 18.

*Dash operation*

With the key lever 12 engaging the dash terminal 16, the enabling potential on lead 11 is coupled through a diode 66 over the lead 34 to the base 36 of the enabling transistor 37 to render the transistor conductive and, thereby operate the pulse generator 17. The first timing pulse output from the pulse generator 17 is again coupled to the two count circuit 18 as in Dot Operation. The two count circuit 18 produces a pulse output which is coupled to the base 63 to render the transistor 64 conductive for one unit time interval. The relay 72 is operated to provide a tone signal at output terminal 80 and close a signal contact between output terminal 48 and ground.

The enabling potential on lead 11 is also applied to the base 76 of an enabling transistor 77 of the four count circuit 21. The transistor 77 is rendered conductive and behaves like a switch to place an emitter 78 of a transistor 81 at the emitter potential of the transistor 82 to condition the four count circuit 21 for operation. The potential at the collector of transistor 77 approaches the emitter potential of transistor 77 which is essentially at the potential of the power supply 39. The four count circuit 21 is a bistable multivibrator circuit having transistors 81 and 82 and steering diodes 83 and 84. The four count circuit 21 is similar to the two count circuit 18 with the addition of the enabling transistor 77.

The first timing pulse from the pulse generator 17 is applied to the two count circuit 18 to render transistor 56 nonconductive, thereby applying the collector potential of transistor 56 to operate the output keyer 19. Simultaneously, by multivibrator action, transistor 57 is rendered conductive and impresses a positive going pulse over a lead 86 through the forward biased diode 83 to a base 87 of the conductive transistor 82. The transistor 82 is rendered nonconductive; and by multivibrator action, the transistor 81 is rendered conductive. When the transistor 82 is cut off, the collector potential is applied over the lead 22, through a diode 88, through the junction point 62, to the base 63 of transistor 64 to hold this transistor conductive. The relay 72 is held energized during the entire period that transistor 82 is held in the nonconductive state, which period is of two unit time intervals duration (see waveform 141, FIG. 3).

It is noted that the two count circuit 18 and four count circuit 21 are bistable multivibrator circuits. The changing of states of the transistors contained in these circuits is effectively instantaneous. Transistors 56 and 57 change states simultaneously and almost immediately, transistors 82 and 81 change states. This means that when the transistors 56 and 82 are rendered nonconductive by the application of a positive pulse to their bases 58 and 87; the collector potentials of transistors 56 and 82 are applied simultaneously to the base 63 to render transistor 64 conductive.

When the first timing pulse is applied to render transistor 56 non-conductive, an output pulse is instantaneously generated at the collector of transistor 57. This pulse is applied immediately to render transistor 82 nonconductive and transistor 81 conductive. Therefore, the collector potential of transistor 82 is applied, effectively simultaneously with the collector potential of transistor 56, through diode 88 to the base 63 of transistor 64. The collector potential of transistor 82 is also applied through diode 88, junction point 62, and diode 55 to the base 36 of transistor 37. The period of conduction and nonconduction of transistor 82 is two unit time intervals (see waveform 140, FIG 3); therefore, the collector potential of transistor 82 is applied to the base 36 of transistor 37 to hold the pulse generator 17 operative until such time as the four count circuit is reset to the original state.

The second timing pulse from the pulse generator 17 is applied to render transistor 56 conductive and reset the two count circuit 18 to the original condition; however, the pulse generator 17 continues to operate due to the collector potential of transistor 82 applied to the transistor 37. The third timing pulse from the pulse generator 17 is applied to render the transistor 56 nonconductive and simultaneously reset four count circuit 21. The collector potential of transistor 56 is applied to the transistor 37 to hold the pulse generator 17 operative for a second cycle of the two count circuit 18.

Figure 3:
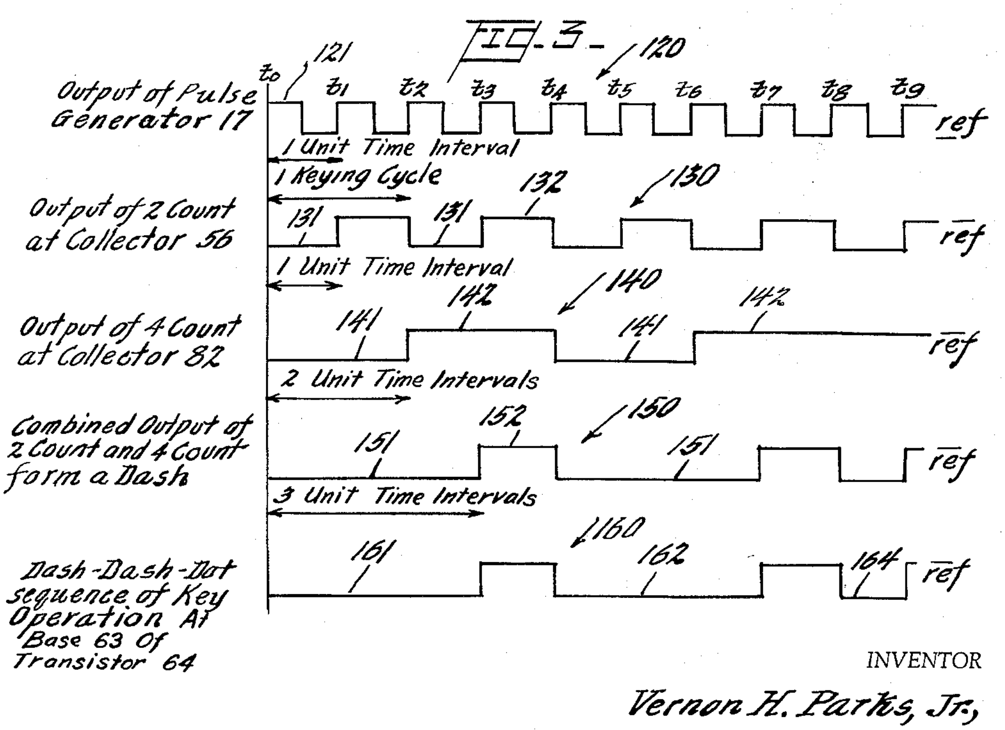
FIG. 3 is a timing diagram showing voltage conditions at various times during the operation of the circuit shown in FIGS. 1 and 2.

In this manner, the two count circuit 18 and the four count circuit 21 initially operate simultaneously, and then the two count circuit 18 operates a second time immediately following the operation of the four count circuit to hold the output keyer 19 operative for three unit time intervals, representative of a dash (waveform 150, FIG. 3). The length of the dash is determined by an operation of the four count circuit 21 followed by an operation of the two count circuit 18.

*Dot memory operation*

With the lever 12 positioned at the dash terminal 16, the enabling potential on lead 11 is also connected over a lead 27 to the memory enabler 26. The memory enabler 26 is a bistable multivibrator circuit having a normally conductive transistor 91 and a normally nonconductive transistor 92. The enabling potential on lead 11 is coupled to a base 93 of the nonconductive transistor 92. The transistor 92 is rendered conductive, and by multivibrator action, the transistor 91 is rendered nonconductive. This action applies the collector potential of transistor 91 over a lead 23 to a base 96 to turn on an enabling transistor 97, which behaves like a switch to condition the dot memory 28 for operation. The emitter of transistor 99 is at the potential of the collector of transistor 97. The collector of transistor 97 approaches the potential of the emitter which is essentially at the potential of the power supply 39. The dot memory 28 is a bistable multivibrator circuit having a normally conductive transistor 101 and a normally nonconductive transistor 99.

If the dot terminal 14 should be contacted, but not held, by the key lever 12 during the transmission of a dash signal, or the following one unit time interval space, the dot signal is ordinarily lost in a conventional code signal sender. However, the code signal sender of this invention utilizes the memory enabler 26 and the dot memory 28 for storing the contacted dot and transmitting the dot after the transmission of the completed dash cycle. The memory enabler 26 is operated and the dot memory 28 is conditioned for possible operation upon each contacting of the dash terminal.

When the dot terminal 14 is thus contacted during transmission of the dash, or the following space interval, the enabling potential on lead 11 is applied over the leads 34 and 100 to the previously conditioned dot memory 28. This enabling potential on lead 11 is applied to a base 102 of the transistor 99. The transistor 99 is rendered conductive and by multivibrator action, the transistor 101 is rendered nonconductive.

With the transistor 101 turned off, its collector potential is applied through a diode 103, over the lead 34, to the base 36 of transistor 37 to maintain the enabling transistor 37 in a conductive state to keep the pulse generator 17 operating. After completion of the dash and the following space, the code signal sender then repeats the Dot Operation previously described. This operation will be accomplished even if the key lever 12 is being held to the dash terminal 16 at this time. This is made possible by the fact that transistor 99 is conducting, thus its collector voltage is too low to provide sufficient enabling voltage on lead 11 for the four count circuit 21.

The timing pulse output from the pulse generator 17 is applied to trigger the two count circuit 18 into operation. The output from the two count circuit 18 is coupled to operate the output keyer 19 and apply a signal at the output terminal 30. This last mentioned signal is representative of the dot which was contacted during the transmission of a dash signal or during the following space.

As mentioned previously, the output from the two count circuit 18 and the four count circuit 21 are coupled to the base 63 of the transistor 64 to render that transistor conductive. As the transistor 64 turns on, a positive going pulse is developed at the collector 71 of the transistor 64 and is coupled through a diode 104 of the memory enabler 26 to the base 93 of transistor 92. This positive going pulse is developed at the collector 71 of transistor 64 each time the transistor is turned on. However, this positive going pulse is only effective to turn off transistor 92 after the memory enabler 26 has been operated.

The transistor 64 is rendered conductive for either of the following reasons: (1) during the transmission of a dot, or (2) during the transmission of a dash. The memory enabler 26 is only operated by the starting of a dash and a positive going pulse is developed at the collector 71 of transistor 64 which is applied to the base 93 of transistor 92. Ordinarily, this positive going pulse from the transistor 64 at the start of a dash would be effective to turn off the transistor 92; however, when the dash terminal 16 is contacted, the collecter potential of transistor 99 is applied directly over lead 27 to the base 93 of transistor 92. This action holds transistor 92 in the on condition, thereby rendering the turn off pulse from transistor 64 ineffective.

It will be noted that the positive going pulse is developed at the collector 71 of transistor 64 only when the transistor is turned on; therefore, the memory enabler 26 remains operated for the duration of the dash pulse and during the following space. The collector potential of transistor 91 is applied to the base 96 of transistor 97 to keep the dot memory 28 enabled. Even if the dot terminal 14 is contacted during this period, the collector potential of transistor 101 is applied through diode 103 to transistor 37. This action maintains the pulse generator 17 operative to provide continued timing pulses for operating the two count circuit 18. The two count circuit 18 produces a dot pulse to operate transistor 64, which in turn, produces a positive going pulse at the collector 71 which is coupled to the base 93 of transistor 92 to reset the memory enabler 26. This action removes the collector potential of transistor 91 from the base 96 of transistor 97 to reset the dot memory 28. This action will be accomplished even if the key lever 12 is held at the dash terminal 16 at this time. This is made possible by the fact that transistor 99, is conducting, thus its collector voltage is too low to hold transistor 92 in a conductive state.

*Timing diagram*

With reference to FIG. 3, there is shown a timing diagram relating the wave form of the output of the pulse generator 17 (waveform 120) to the output of the two count circuit 18 (waveform 130) and the four count circuit 21 (waveform 140), and a waveform showing the output of the two count circuit 18 and the four count circuit 21 combined to form a pulse representative of a dash (waveform 150). There is also shown a waveform 160, depicting the output of the output keyer 19 for a typical operation in a dash-dash-dot sequence.

Waveform 120 represents the timing pulse output of the pulse generator 17 and is essentially a square wave. A cycle of operation of the pulse generator 17 occupies one unit time interval. Two cycles of operation of the pulse generator 17 occupy two unit time intervals, or one complete dot keying and spacing cycle of the code signal sender. The timing pulses 121 from the pulse generator 17 are impressed upon the two count circuit 18 to change the state of operation of the circuit.

Waveform 130 represents the pulse output of the two count circuit 18 at the collector of transistor 56 and is essentially a square wave. A cycle of operation of the two count circuit 18 occupies one unit time interval of marking output 131 and one unit time interval of spacing output 132, or one complete dot keying and spacing cycle. Waveform 130 is applied to the base 63 of the transistor 64 in the output keyer 19 (FIG. 2). The transistor 64 is rendered conductive by the portion of the waveform 130 designated 131 to complete a circuit for operating the relay 72 for a period of one unit time interval, which is representative of a dot.

Waveform 140 represents the output of the four count circuit 21 at the collector of transistor 82 and is essentially a square wave. A cycle of operation of the four count circuit 21 occupies two unit time intervals of marking output 141 and two unit time intervals of spacing output 142. The waveform 140 is impressed upon the base 63 of the transistor 64 in the output keyer 19. The transistor 64 is turned on by the portion of the waveform 140 designated 141 to complete a circuit for operating the relay 72 for a period of two unit time intervals.

Waveform 150 represents the outputs of both the two count circuit 18 and the four count circuit 21 applied to the base 63 of transistor 64 in the output keyer 19 and is essentially a rectangular wave consisting of three unit time intervals of marking output 151 and one unit time interval of spacing output 152. The waveform 150 is applied to the base 63 of the transistor 64 in the output keyer 19. The transistor 64 is turned on by the portion of the waveform 150 designated 151 to operate the relay 72 for a period of three unit time intervals representative of a dash.

In FIG. 3, the waveforms 120, 130, 140, 150, and 160 are correlated with respect to time with each other and all start at time $t_0$, so that any individual portion of any waveform may be accurately associated with any other portion in FIG. 3. In the production of a dot signal, the two count circuit 18 is only operated once to apply a pulse—portion 131 of waveform 130—to operate the output keyer 19 for one baud unit of time.

In the productioin of a dash signal, however, the two count circuit 18 is operated twice. When the dash terminal 16 is contacted by the key lever 12, the transistors 56 and 82 change states almost simultaneously, so that the collectors of the transistors exhibit the waveform portions 131 and 141, respectively. Therefore, the two count circuit 18 must be operated a second time to keep the output keyer 19 operated for three unit time intervals, shown as waveform 150. Portion 151 of waveform 150, operates output keyer 19 for one three unit time interval period.

Waveform 160 represents the input to the output keyer 19 for a dash-dash-dot sequence of operation. When the key lever 12 is contacted to the dash terminal 16, a dash pulse 161 is impressed upon the output keyer 19, as previously explained with respect to waveform portion 151 of waveform 150. When the key lever 12 is held at the dash terminal 16 through and slightly past $t4$ but released before $t8$, a second dash pulse 162 is impressed upon the output keyer 19. As previously explained with respect to waveform 151, the two count circuit 18 operates twice and the four count circuit 21 operates once in the production of each dash pulse 161 and 162. This can be seen by extending the vertical edges of the dash pulses 161 and 162 upward to intersect waveforms 150, 140, and 130.

If the dot terminal 14 is contacted during the period of time following $t4$, the dot memory circuitry of this invention—namely, the memory enabler 26 and the dot memory 28—are rendered effective to store the pulse 164 and transmit this pulse after the completion of the transmission of the dash pulse 163, independent of the position of the lever 12. The dot pulse 164 is properly sequenced, spaced, and timed.

It is to be understood that the above-described circuit is merely illustrative and numerous other arrangements could be devised without departing from the invention.

What is claimed is:

1. In a device for transmitting coded signals,
a first signal generating means,
a second signal generating means,
a key contact circuit means having first and second contacts selectively closed for selectively operating said first and second signal generating means,
a normally unoperated memory circuit means for operating a first signal generating means following operation of said second signal generating means, and
means responsive to sequential closure of said second contacts and then said first contacts during operation of said second signal generating means for operating said memory circuit means.

2. A code signal sending device, comprising,
a key circuit having first and second contacts selectively closed to either of said contacts,
a first pulse counting means operated by said key circuit through either contact of the key circuit,
a second pulse counting means operated by said key circuit through the second contact of the key circuit,
a memory enabler circuit means operated by closure of the key circuit to the second contact, and
memory circuit means conditioned by the operation of said memory enabler circuit means and operated by closure of the first contact of said key circuit during the operation of said second pulse counting means for subsequently operating said first pulse counting means after the operation of said second pulse counting means.

3. A device for transmitting signal pulses of two discrete durations, comprising a key circuit having a pair of contacts selectively closed by a movable key contactor to a first or second contact, a first pulse counting circuit rendered operative through the first or second contact of said key circuit for generating a first signal pulse of a first duration, a second pulse counting circuit rendered operative through the second contact of said key circuit for generating a second pulse of a second signal duration, a memory enabler circuit means operated by closure of said key circuit to said second contact, and a memory circuit conditioned by the operation of said memory enabler circuit means and subsequently operated by closure of the first contact of said key circuit during the operation of the second pulse counting circuit for operating said first pulse counting circuit independently of said key circuit.

4. In a signal transmitter, a first source of signals of a first character, a second source of signals of a second character, a transmitting circuit, including a keying circuit and a source of audio tone, a selectively operated switching means, means responsive to said switching means for selectively connecting said first and second sources of signals to said transmitting circuit, means conditioned by the connection of said second source of signals to said transmitting circuit for storing a signal condition indicative of said first character, means rendered effective by the selective means attempting to connect said first signal source to said transmitting circuit during connection of said second signal source to said transmitting circuit for operating said conditioned storing means, and means responsive to the operation of said storing means and rendered effective upon the termination of transmission from said second source of signals for connecting said first source of signals to said transmitting circuit.

5. In a circuit for transmitting permutations of signal impulses having two distinct durations, first means for generating signal impulses of a first duration, second means for generating signal impulses of a second duration, a key circuit having a pair of contacts that are selectively closed for operating one or the other of said generating means, a memory enabler circuit operated by the selective closure of a second contact in said key circuit, a storage circuit conditioned for operation by the operation of the memory enabler circuit, means rendered effective by the selective closure of a first contact in said key circuit during operation of said second signal generating means for operating said conditioned storage circuit, and means coupling the storage circuit to the first signal generating means for operating said first signal generating means independently of the key circuit.

6. A code signal sending device for transmitting signals of two discrete durations, comprising, a pulse generating means for producing timing pulses, a key circuit having a pair of contacts for operating the pulse generating means through the selective closure of a first or second contact, a first multivibrator circuit operated by the pulse generating means for producing signals of a first duration, a second multivibrator circuit operated by the first multivibrator circuit through the selective closure of the key circuit to the second contact for producing signals of a second duration, a memory enabler circuit operated by the selective closure of the key circuit to the second contact, a memory circuit conditioned for operation by the operation of the memory enabler circuit through closure of the key circuit to the second contact, and subsequently operated by closure of the first contact of the key circuit during operation of the second multivibrator circuit, and circuit means for coupling the output of the memory circuit to the pulse generator circuit for operating the first multivibrator circuit after the operation of the second multivibrator circuit independent of the key circuit.

7. A code signaling device for transmitting signals of different time durations, representative of dots and dashes, comprising, an astable multivibrator pulse generator circuit for producing timing pulses, a first bistable multivibrator circuit operated by said pulse generator circuit for producing signal pulses of a first duration representative of a dot, a key circuit having dot and dash terminals selectively closed to the pulse generator circuit for selectively operating said generator circuit through the dot or dash terminal, a second bistable multivibrator circuit operated by the first bistable multivibrator circuit through the selective closure of the second contact of the key circuit for producing signal pulses of a second duration, circuit means for sequentially receiving the signal pulses from the second and first multivibrator circuits to form a signal pulse of a third duration representative of a dash, a bistable multivibrator memory enabler circuit operated by the selective closure of the key circuit to the dash terminal, a bistable dot memory circuit conditioned by the operation of the memory enabler circuit and operated by closure of the key circuit to the dot terminal during the operation of the second multivibrator circuit, and circuit means for coupling the output of the dot memory circuit to the pulse generator circuit for recycling the first bistable multivibrator circuit after the cycling of the second bistable multivibrator circuit.

8. In a code signal transmitter, a first bistable multivibrator having an initial stable state of operation, a second bistable multivibrator having an initial stable state of operation, a free running pulse generator connected to the first multivibrator for producing a series of pulses, each of which changes the stable state of operation of said first multivibrator, a first transistor switch for normally precluding operation of said pulse generator, a first selectively operated means for operating said transistor switch to release said pulse generator to drive said first multivibrator, means connected to said first multivibrator and said first transistor switch for holding said first transistor switch in an operated condition until the first multivibrator is restored to the initial condition, means responsive to the initial change in conductive state of said first multivibrator for changing the stable state of said second multivibrator, a second transistor switch for conditioning said second multivibrator for operation, a second selectively operated means for operating said first and second transistor switches, means connected to said second multivibrator for holding said first and second transistor switches operated until said second multivibrator is restored to the initial condition, and means for maintaining said first transistor switch operated to operate said first multivibrator again upon the restoration of the second multivibrator to the initial condition.

9. A device for producing coded signals, comprising:

a pulse generator, a first counting circuit, a second counting circuit having a period of operation substantially greater than said first counting circuit, keying means responsive to the operation of either said first or said second counting circuits for generating said coded signals, means for selectively energizing said first counting circuit and said first and second counting circuits, and means responsive to the selective operation of said first and second counting circuits, for re-energizing said first counting circuit after said second counting circuit has ceased to operate.

10. A device for transmitting coded signals which consists of spaced, intermixed first and second pulses of unequal time duration, which comprises:

an output circuit, a keying means responsive to an external control potential for generating said first and second pulses in said output circuit, the duration of said first and second pulses being directly proportional to the duration of said control potential, a first counting circuit having a predetermined period of operation connected to said keying means for supplying control potential to said keying means for a first predetermined duration, a second counting circuit having a predetermined period of operation substantially greater than said first counting circuit and connected to said keying means for supplying control potential to said keying means for a second predetermined time duration, means coupling the second counting circuit to re-energize said first counting circuit for maintaining the control potential on said keying means, a source of enabling potential, a normally unoperated pulse generator for operating said first and second counting circuits, switching means movable to two positions for selectively operating said pulse generator to energize said first counting circuit and to selectively energize said first and second counting circuits whereupon said second counting circuit re-energizes said first counting circuit and said keying means generates said second pulse whose time duration is the summation of the periods of operation of said first and second counting circuits, a normally unoperated diode circuit for re-operating said pulse generator to operate said first counting circuit, a memory circuit for operating said diode, a memory enabler circuit operated by said switching means initiating operation of said first and second counting circuits for conditioning said memory circuit for operation, and a circuit energized by said switching means being moved from the second to a first position during operation of said second counting circuit for operating said conditioned memory circuit to operate said diode circuit to re-operate said pulse generator.

11. A device for transmitting trains of spaced, intermixed first and second coded pulses of unequal time duration, which comprises:

a source of timing signals having means for varying the repetition rate, a first counting circuit connected to and operated by said source of timing signals, a second counting circuit connected to and operated by said source of timing signals and having a period of operation substantially greater than said first counting circuit, an output circuit, keying means responsive to the operation of said first and second counting circuits for generating said coded pulses on said output circuit, switching means for selectively operating said first and second counting circuits to operate said keying means to impress said first and second coded pulses on said output circuit, means connected to said first and second counting circuits and said switching means energized upon the movement of said switching means to operate said second counting circuit for storing an attempted operation of said first counting circuit by said switching means, and means operated by said energized storing means for operating said first counting circuit after said second counting circuit has ceased to operate.

References Cited by the Examiner

UNITED STATES PATENTS 2,658,946 11/1953 Kaye -------------- 340—353

NEIL C. READ, *Primary Examiner.*

THOMAS B. HABECKER, *Examiner.*